No. 650,655. Patented May 29, 1900.
G. C. PYLE.
MACHINE FOR MAKING HOLLOW GLASSWARE.
(Application filed Apr. 19, 1899.)
(No Model.) 4 Sheets—Sheet 1.
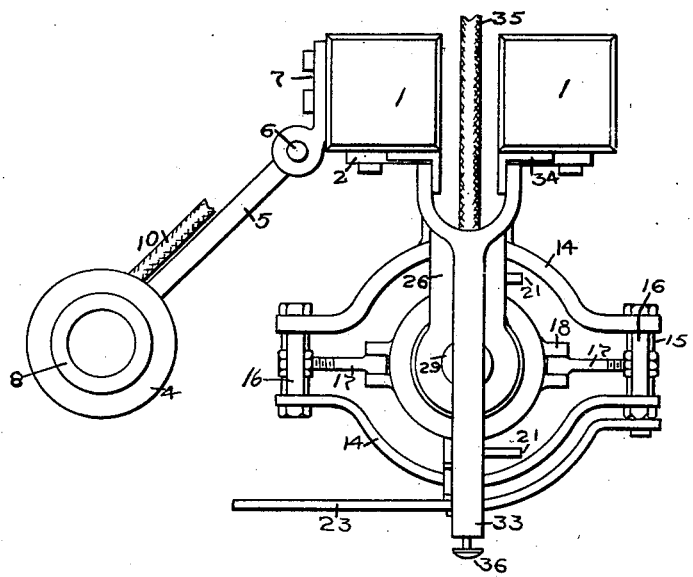
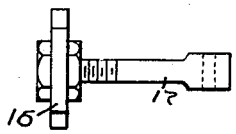
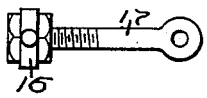
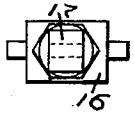
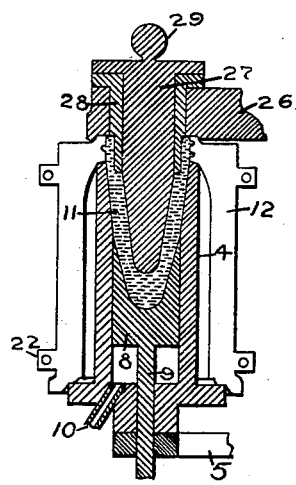
WITNESSES:
G. H. Blaker
M. C. Buck.
INVENTOR,
George C. Pyle
BY V. H. Lockwood
His ATTORNEY.

No. 650,655. Patented May 29, 1900.
G. C. PYLE.
MACHINE FOR MAKING HOLLOW GLASSWARE.
(Application filed Apr. 19, 1899.)
(No Model.) 4 Sheets—Sheet 2.

WITNESSES:
G. H. Blaker.
M. C. Buck.

INVENTOR.
George C. Pyle.
BY V. H. Lockwood.
His ATTORNEY.

No. 650,655. Patented May 29, 1900.
G. C. PYLE.
MACHINE FOR MAKING HOLLOW GLASSWARE.
(Application filed Apr. 19, 1899.)
(No Model.) 4 Sheets—Sheet 3.
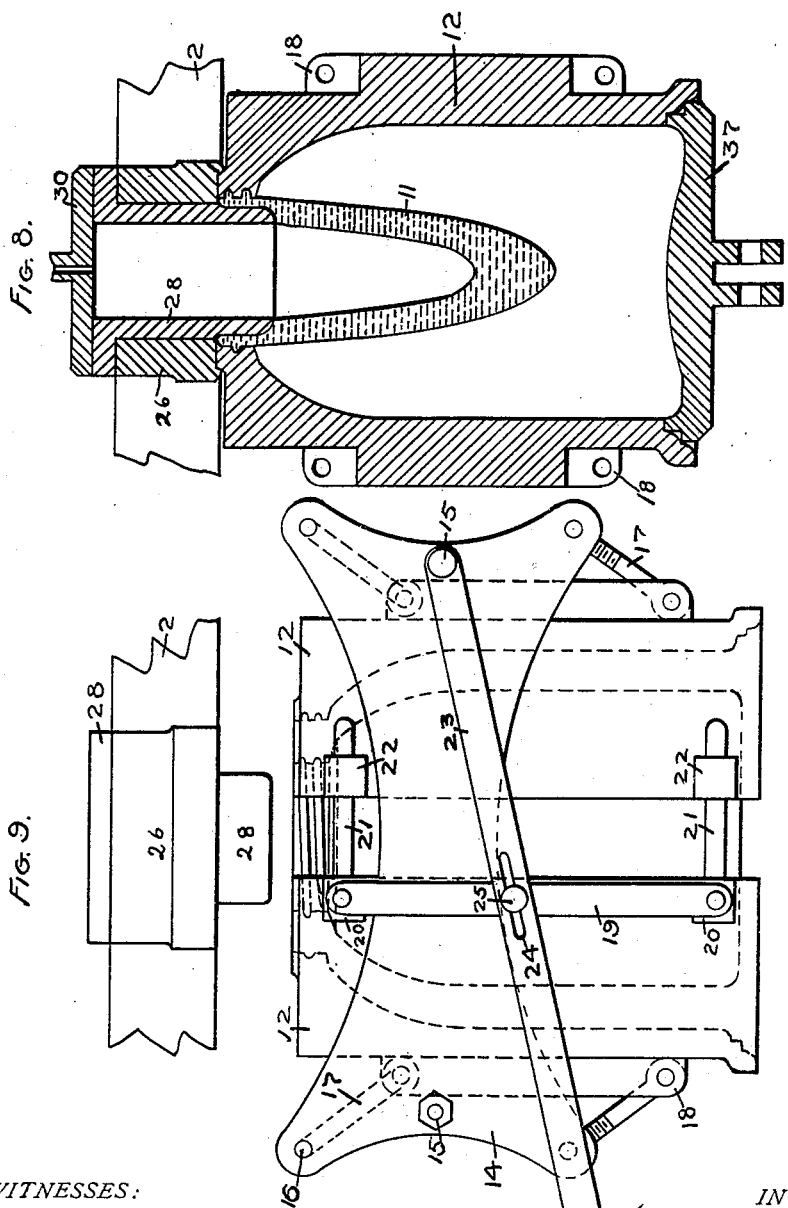
WITNESSES:
G. H. Blaker
M. C. Buck
INVENTOR.
George C. Pyle.
BY V. H. Lockwood
His ATTORNEY.

No. 650,655. Patented May 29, 1900.
G. C. PYLE.
MACHINE FOR MAKING HOLLOW GLASSWARE.
(Application filed Apr. 19, 1899.)
(No Model.) 4 Sheets—Sheet 4.

WITNESSES:
G. H. Blaker.
M. C. Buck

INVENTOR.
George C. Pyle
BY V. H. Lockwood
His ATTORNEY.

UNITED STATES PATENT OFFICE.

GEORGE C. PYLE, OF INDIANAPOLIS, INDIANA.

MACHINE FOR MAKING HOLLOW GLASSWARE.

SPECIFICATION forming part of Letters Patent No. 650,655, dated May 29, 1900.

Application filed April 19, 1899. Serial No. 713,629. (No model.)

*To all whom it may concern:*

Be it known that I, GEORGE C. PYLE, of Indianapolis, county of Marion, and State of Indiana, have invented a certain new and useful Machine for Making Hollow Glassware; and I do hereby declare that the following is a full, clear, and exact description thereof, reference being had to the accompanying drawings, in which like figures refer to like parts.

The object of this invention is to make hollow glassware by means of an improved mechanism by first partially forming the article by external pressure of an external former about a stationary internal former, whereby the neck of the article is formed and the body partly formed, and the body is finished in a subsequent operation of the machine by blowing. In this connection one object is to provide a mold apparatus which will accomplish this result without inverting the same, but by merely swinging the parts laterally out of the way. The advantage of this means of forming the neck and partly forming the body is that the action of the external former is positive, definite, and accurate, for the form of the external former and of the internal former can be made as desired, whereby the thickness of the partially-formed body can be accurately predetermined as to any part thereof and the glass material be definitely and evenly distributed, so that when finished by internal blowing the thickness of the glass will be uniform.

The full nature of my invention will appear from the accompanying drawings and the description and claims following.

Figure 2:
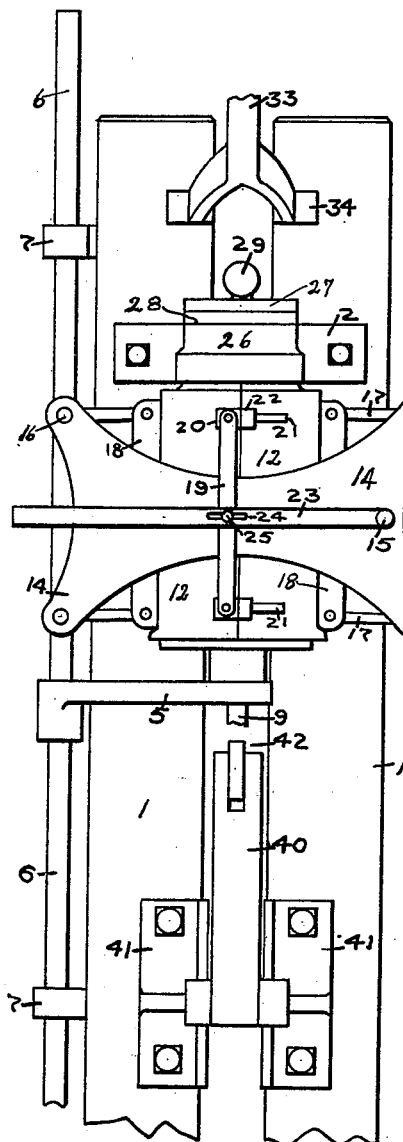
Figure 3:
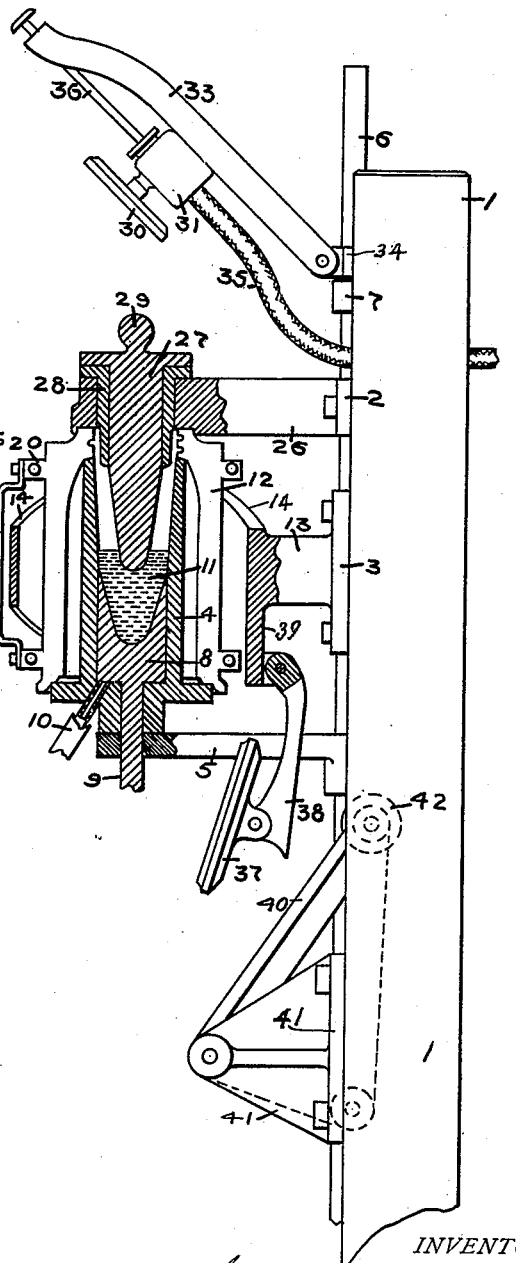
Figure 10:
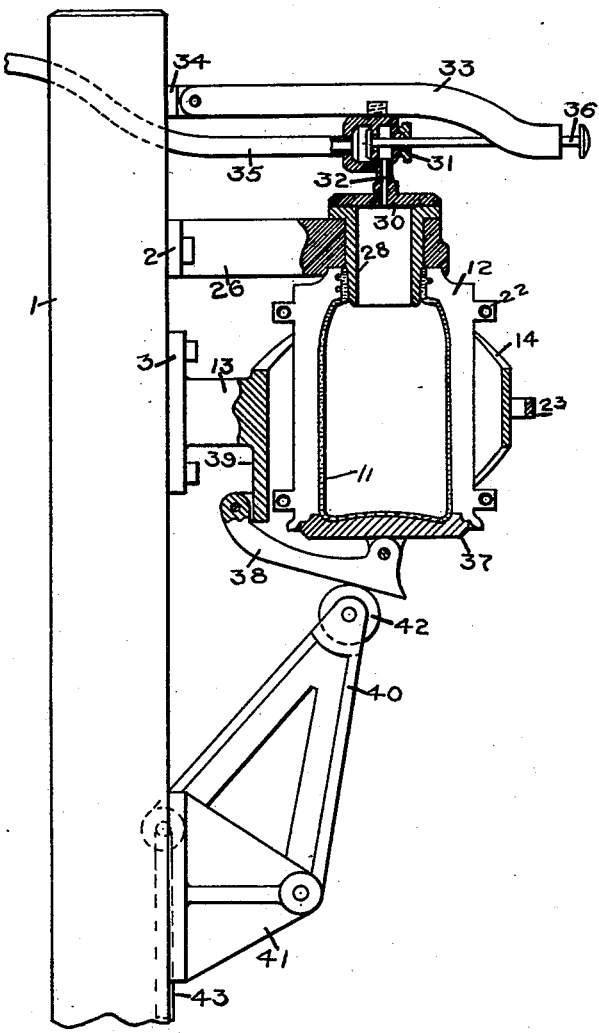

In the drawings, Figure 1 is a plan of my machine. Fig. 2 is a front elevation thereof. Fig. 3 is a side elevation, the mold apparatus being in section and showing the parts immediately after the glass has been put in the mold. Fig. 4 is a central vertical section of the mold after the external former has been forced upward against the glass. Figs. 5, 6, and 7 are details of the radial bars. Fig. 8 is a central vertical section of the mold apparatus after the formers have been removed and it is in condition for blowing. Fig. 9 shows the mold apparatus after the mold has been opened for removal of the finished article. Fig. 10 is a side elevation of the machine, showing the parts in place when the article is finished, some parts being in section.

In detail, 1 represents a pair of upright pieces of timber, constituting a frame. They are held in position by the cross-plates 2 and 3 and by a suitable base, which, however, is not shown. I provide an inner mold 4, carried on the arm 5, rigidly secured to the vertical rod 6, that is adjustably mounted to the plate 7, secured to the side of one of the uprights, as appears in Figs. 1 and 2. The vertical rod 6 is vertically reciprocable by a suitable pedal mechanism. The inner mold 4 is open at the top and carries within it a reciprocal external former 8, that fits snugly in the lower part of the inner mold and has a stem 9 depending therefrom through a suitable opening in the lower end of the inner mold and the arm 5. Into the lower end of the inner mold I introduce an air-inlet pipe 10 from any suitable source of compressed air. At the beginning of the operation the parts just described are swung out into the position shown in Fig. 1 and the quantity of molten glass 11 is put in at the upper end of said inner mold. The upper end of the external former 8 is formed cup-like or having a depression, substantially as shown in Figs. 3 and 4, said depression tapering from the top to the bottom, and into this the mass of molten glass is originally received. It is then swung around from the position shown in Fig. 1 to a position immediately below the outer mold 12, said outer mold in that stage of the operation being open at the bottom. The inner mold containing the molten glass and external former is then elevated by a pedal mechanism until it enters the outer mold and reaches the limit of movement therein, as appears in Fig. 3. It is held in place by the foot on the pedal during the very short period of time that it is required to remain in that position.

The outer mold 12 is formed in two parts, with the upper portion so formed as to shape the surface of the neck of the article to be made. It is supported by the arm 13, secured to the plate 3, which carries a yoke 14. The tops of the two halves of said yoke appear in Fig. 1, and the sides thereof appear in Fig. 2. These yoke-pieces are widened at their ends and are connected by cross-rods 15, whereby the two ends of the yoke-pieces are held together. In the upper and lower corners of the yoke on each side the bars 16 are pivotally mounted, to which the radial arms 17 are secured at one end. These arms are pivotally mounted in the flanges 18 on the side of the outer mold. At the junction of the two halves of the outer mold, as appears in Figs. 2 and 9, there is a vertical bar 19, secured to a pair of lugs 20 on one half the mold. These lugs have secured to them a pair of horizontal pins 21, (seen in Fig. 9,) that enter holes in the lugs 22 on the other half of the mold. This causes the two halves of the mold to register with each other when closed. I provide a hand-lever 23, pivoted at one end on the rod 15 and about centrally provided with the longitudinal slot 24, through which the pin 25 on the vertical bar 19 extends. The pins 21 are so long that they never escape from the lugs 22. The parts are in the position shown in Fig. 9 when the mold is opened to the limit. The mold is closed by elevating the left-hand end of the lever 23, as it appears in Figs. 1 and 9. That movement elevates the mold by reason of the connection with the bar 19, that is secured to the mold, and when the parts of the mold are being elevated it is obvious that the radial bars 17 will force the two parts of the mold toward each other and close them tight. When it is desired to open the mold, the left-hand end of said lever 23 is depressed into the position shown in Fig. 9, which causes the opposite movement of the parts.

An arm 26, extending horizontally from the plate 2, as appears in Fig. 3, carries the internal former. It is made of two parts—a central part 27 and a surrounding or outer part 28. The outer part is provided on its upper end with a lateral flange that causes it to be supported in a hole in the arm 26. Its lower end is so formed as to form the internal surface of the neck of the glass article being made, coöperating with the neck of the outer mold in forming the neck of the article. The inner part 27 of the internal former is tapered at its lower end, substantially as shown, and has at its upper end a horizontal flange which causes it to rest upon the outer part 28, and it is also provided with the finger-piece 29, whereby said inner part 27 can be removed without disturbing the outer part 28 of said inner mold.

On the lower side of the outer end of the arm 26 I provide a seat or annular groove for the upper end of the outer mold 12. When said outer mold is in its closed position, it fits up snugly in this seat against the arm 26, as appears in Fig. 3. When the mold is opened, it moves downward from said arm 26.

When the parts heretofore described are in the position shown in Fig. 3, the inner mold containing the molten glass being in place, compressed air is introduced through the pipe 10 in the lower part of the inner mold and under the external former 8. It forces said external former from the position shown in Fig. 3 to that shown in Fig. 4, thus forcing the glass positively and firmly about the internal former and shaping it in the neck of the mold. This makes the glass form perfectly in the neck of the mold. By forming the external and internal formers in the shape shown, the surface of the one being substantially parallel with the other, the partially-formed body of the article contains glass of substantially the same thickness excepting at the lower end. The external former is so shaped as to leave the larger and thicker portion of the glass at that point for forming the bottom of the finished article. After the parts have been operated as described and are in the position shown in Fig. 4 the air through the pipe 10 is shut off and the inner mold, together with the external former 8, is allowed to drop out of the outer mold and is swung out of the way into the position shown in Fig. 1. Then the part 27 of the internal former is withdrawn, being lifted out of the finger-piece 29, and the lid 30 is depressed to rest upon the upper end of the outer part 28 of the internal former, as appears in Figs. 8 and 10.

The lid 30 is attached to an air-valve 31, having an air-inlet 32 extending centrally through it. The air-valve is mounted on the lever 33, pivoted to the bracket 34, that is secured to the uprights, as appears in Figs. 2 and 10. Said valve is supplied with air through the pipe 35 from any suitable source, and the valve is operated by the stem 36, whose outer end extends through the outer end of the hand-lever 33 and is supported thereby.

The lower end of the outer mold 12 is closed by the bottom 37, centrally pivoted to one end of the arm 38, that at its other end is pivoted to an extension 39 from the arm 13. This permits the bottom to drop down and out of the way, as appears in Fig. 3, and it is moved into position after closing the mold, as appears in Fig. 10, by the bell-crank 40, mounted in the bracket 41, secured to the uprights. At its upper end it carries a roller 42, that engages the lower side of the arm 38. The bell-crank is actuated by the link 43, that extends to a suitable mechanism. When the top is closed by the lid 30 and the bottom is closed by the bottom piece 37, the glass is in the form shown in Fig. 8. It is then blown by air passing through said lid 30 into the form shown in Fig. 10. This completes the article. The bottom 37 is then permitted to drop back into the position shown in Fig. 3. The outer mold is opened, as shown in Fig. 9, by operating the lever 23, whereupon the article drops out.

What I claim as my invention, and desire to secure by Letters Patent, is—

1. A glass-making machine including a mold, an internal former extending into one end thereof and consisting of two parts one within the other and each separably removable from the mold, and means for forcing the molten glass in the mold about said former.

2. A glass-making machine including a mold, an internal former extending into one end thereof and consisting of two parts one within the other and each separably removable from the mold, the outer one to form the neck of the article and the inner one to partly form the body thereof, and means for forcing the molten glass in the mold about the former.

3. A glass-making machine including an outer mold, a stationary internal former mounted in the upper end thereof, an inner mold, means for moving said inner mold up through the bottom of the outer mold and around the internal former, a movable bottom piece or former in the lower end of the inner mold, and means for moving it upward to force the molten glass about the internal former.

4. A glass-making machine including an outer mold, a stationary internal former mounted in the upper end thereof, an inner mold, a movable bottom piece or former in the lower end of the inner mold, means for moving said inner mold and movable former up through the bottom of the outer mold and around the internal former, means for moving said movable bottom piece or former in the inner mold upward to force the molten glass about the internal former, means for removing the inner mold and movable former therein downward out of the outer mold before the glass is blown, a bottom piece for said outer mold after the inner mold is removed, and means for blowing the glass article thus partly formed after the bottom of the outer mold is in place.

5. A glass-making machine including an outer mold, a stationary internal former mounted in the upper end of the mold, an inner mold, a swinging arm upon whose outer end said inner mold is supported so as to enter the lower end of said outer mold, means for vertically moving said swinging arm, a movable bottom or former in the lower end of the inner mold, and means for elevating it therein.

6. A glass-making machine including a divided mold, means that prevent independent vertical movement of the parts of the mold, a yoke surrounding the mold, and connection between the yoke and the parts of the mold whereby the latter will be separated when the relative position of the mold and yoke is changed.

7. A glass-making machine including a divided mold, pins extending from the engaging sides of one part of said mold, perforated lugs on the engaging sides of the other part of said mold that reciprocate on said pins, a stationary yoke, radial arms connecting said yoke with the parts of said mold so that when horizontal they will close said mold, and means for moving said mold within said yoke whereby the mold is opened and closed.

In witness whereof I have hereunto affixed my signature in the presence of the witnesses herein named.

GEORGE C. PYLE.

Witnesses:
M. C. BUCK,
V. H. LOCKWOOD.